United States Patent [19]

Schumm, Jr.

[11] Patent Number: 5,304,431
[45] Date of Patent: Apr. 19, 1994

[54] FLUID DEPOLARIZED ELECTROCHEMICAL BATTERY WITH AUTOMATIC VALVE

[76] Inventor: Brooke Schumm, Jr., 31220 Lake Rd., Bay Village, Ohio 44140

[21] Appl. No.: 886,513

[22] Filed: May 20, 1992

[51] Int. Cl.$^5$ .............................. H01M 2/00
[52] U.S. Cl. .................................. 429/27
[58] Field of Search ......................... 429/27, 33

[56] References Cited

U.S. PATENT DOCUMENTS

| | | | |
|---|---|---|---|
| 2,468,430 | 4/1949 | Derksen | 429/27 |
| 3,746,580 | 7/1973 | Aker et al. | |
| 4,011,366 | 3/1977 | Bones et al. | 429/61 |
| 4,035,552 | 7/1977 | Epstein | 429/58 |
| 4,039,728 | 8/1977 | Cheron | 429/22 |
| 4,074,022 | 11/1976 | Nadal | 429/54 |
| 4,177,327 | 12/1979 | Mathews et al. | 429/27 |
| 4,189,526 | 2/1980 | Cretzmeyer | 492/13 |
| 4,529,673 | 7/1985 | Zupancic | 429/53 |
| 4,547,438 | 10/1985 | MacArthur et al. | 429/82 |
| 4,894,295 | 1/1990 | Cheiky | 429/77 |
| 4,913,983 | 4/1990 | Cheiky | 429/13 |
| 5,069,419 | 12/1991 | Jerman | 251/11 |

OTHER PUBLICATIONS

Electrothermaol Actuators vie with electromagnets & solenoid, 1975.
Schumm, Jr., "Batteries," Encyclopedia of Physical Science and Technology, vol. 2, pp. 387, 396–397 (Academic Press 1987) p. 390.
Tuck, Modern Battery Technology, Ellis Horwood Series in Applied Science and Industrial Technology (London N.Y. 1991) pp. 126, 128, 129, 135–138, 161–162, 166–167, 187–188.
"Electrothermal Actuators Vie with Electromagnets and Solenoids," Product Engineering, Oct. 1975, pp. 19–21.
"Relay has no Coil-Actuators Heated to Open/Close Contacts" Automation, Aug. 1975, p. 17.
Power Sources 4 Research and Development in Non-Mechanical Electrical Power Sources, Proceeds of the 8th International Symposium held at Brighton, Sep. 1972, Ed by DH Collins, (Oriel Press).
I. C. Sensors Marketing Literature and Product Catalog, Mar. 1992–title: Electrically Activated, Normally Closed Diaphragm Valves.

Primary Examiner—Prince Willis, Jr.
Assistant Examiner—M. Nuzzolillo
Attorney, Agent, or Firm—Brooke Schumm, III; Gay Ann Spahn

[57] ABSTRACT

The combination of a gas depolarized electrochemical battery with one or more tiny electrically activated thermally responsive semiconductor microactuators (a "valve on a chip") disposed over the fluid entrance inlet(s) creates an efficient gas depolarized electrochemical power supply which permits the entrance of oxygen from air to the battery only when the battery is supplying electrical power to a load. The valve on a chip is singularly suited for use in a single flashlight size cell. Power for the valve is preferably derived from the battery itself but could be provided by a separate source within or without the battery. The valve on a chip is singularly suited for use in a single flashlight size cell or smaller. Power for the valve is preferably derived from the battery itself but could be provided by a separate source within or without the battery. This tiny valve acts as a safety pressure vent and can act as a safety fuse as well. When electrical power is not required from the battery, the valve excludes entry of harmful impurities and unneeded fluid reactants thereby increasing the life of the battery during storage or when the electrical device the battery is powering is idle. A resistance means in parallel to the actuator valve is useful to enhance the operation of the power supply. If the battery leaks, the corrosive fluid causes the valve and/or battery to cease to operate. The combination with a recharging apparatus is also useful. The battery may be designed to regulate the flow of reactant.

40 Claims, 6 Drawing Sheets

FLUID DEPOLARIZED ELECTROCHEMICAL BATTERY WITH AUTOMATIC VALVE

BACKGROUND OF THE INVENTION

1. Technical field of the invention

This invention relates to gas depolarized electrochemical batteries comprising at least one cell, particularly those consuming oxygen from the air. An efficient semiconductor microactuator (a valve-on-a-chip) is placed on a sealed battery (a battery including at least one cell) so that the semiconductor microactuator is the sole means of entry of fluid depolarizer, most often air, to the battery, permitting the battery to operate when the battery is supplying electrical current to a load. The invention also encompasses micromachining a valve mechanism. The invention excludes fluid depolarizer and impurities when the battery is not supplying electrical current to an electrical load to prevent the battery from discharging and losing power capacity while not in use. The semiconductor microactuator will break down in such a way when the battery "leaks" to minimize damage to the device the battery is operating. The semiconductor microactuator acts as a pressure relief valve. The semiconductor microactuator may also be designed to act more optimally as a safety pressure valve or as a fuse. The battery is rechargeable and this invention covers the combination with a recharger and with a control device to maximize the charge.

2. Background and Description of Related Art

Gas depolarized cells exist in many types and varieties. The most common in commercial use today are metal-air cells, especially zinc-air cells. In a zinc-air cell, the oxygen in air, by a series of reactions, reacts with the zinc in the cell, producing electrical current. Most of the variety of gas depolarized cells to which this invention relates are described in McArthur et al., U.S. Pat. No. 4,547,438, Oct. 15, 1985, Zupancic, U.S. Pat. No. 4,529,673, Jul. 16, 1985, Mathews et al, U.S. Pat. No. 4,177,327, and literature cited in those patents.

The principal advantage of zinc-air cells is that higher energy density--, i.e., meaning watts per unit of mass, can be achieved using oxygen of the air, or other gas, as a "fluid" cathode material. This is, instead of, for instance, the solid material found in a typical home flashlight battery. A cell of a given standard size can contain much more anode and electrolyte volume because the oxygen reactant is "stored" outside in the atmosphere. This is useful in small devices such as hearing aids, and also useful in larger cells, such as flashlight "D" or "C" cells, or in the largest of batteries such as in an electric car where much power is needed, but space used takes away from space for other uses. Similarly, a cellular or portable phone is a good use.

Further describing the general design and technical aspects of the cell, in a typical cell (or combination of cells, referred to as a battery) of this type, the negative side of the cell, or anode, is made of a metal, most often zinc, and less often of aluminum and magnesium because of their high electromotive potential. The positive side, or cathode, is usually manufactured as a plastic-bonded, metal-oxide-and-carbon-porous body adhered to a conductive screen or layer. The metal oxide acts as a catalyst for oxygen reduction and to give the cell start-up power as gas containing oxygen, usually air, diffuses into the cathode pores when the cell is activated. The electrolyte is the material in the cell through which charged ions may pass and where key steps of the chemical reaction producing electrical potential or voltage occur. Schumm, Jr., "Batteries," Encyclopedia of Physical Science and Technology, vol 2, p. 387, 390, 396-97 (Academic Press, Inc. 1987). The metals which can be used include, for example, lead, calcium, beryllium, and lithium and alloys and mixtures of those elements. The use of the word "air" is employed for convenience to mean an oxygen source, which source could thus be other gas mixtures including oxygen.

In a single gas depolarized electrochemical cell, for instance one of the Gould type, Cretzmeyer et al., U.S. Pat. No. 4,189,526, the air enters through vent holes in the outside container of the cell through a polytetrafluoroethylene (often sold as "Teflon", Trademark of Dupont Co.) layer.

When such a cell is not operating, the reactant fluid, oxygen in the air, as well as other impurities, must be excluded. Previously, no combination of a valve and battery existed where the parasitic use of power by the valve did not substantially diminish the life or the power of the cell or consume too much space or structure.

Excluding fluids and depolarizing gas prevents the cell from degrading through several processes of corrosion, moisture change and impurity entry which: a) shorten the "shelf" or storage life of the cell when it is not in use, and b) necessitate more frequent changes of the cell in an electrically powered device. Since a common use for this type of cell is for a hearing aid, it is commercially useful not to have to change the battery so frequently. Another common use for the cell is in a buoy at sea; exclusion of the humid, salty sea air when the cell is not operating and reduction of the frequency in changing the cell, or cells in a battery, save much labor and money. The control of the passage of water vapor by the valve prevents the cell from swelling or otherwise being damaged, and prevents dehydration of the cell while not operating. Also, carbon dioxide, which degrades the performance of the cell, is precluded from entering the cell when the cell is not operating.

Previous engineering designs used a variety of means to attempt to overcome these problems. Several inventions used a mechanism physically operated by the user where the valve or vent cover is attached to the switch turning a device "on" so that when the switch moves, the cover moves. Derksen, U.S. Pat. No. 2,468,430 dated Apr. 26, 1949; Cheiky, U.S. Pat. No. 4,914,983 dated Apr. 3, 1990, and H. R. Espig and D. F. Porter, Power Sources 4: Research and Development in Non-Mechanical Electrical Power Sources, Proceedings of the 8th International Symposium held at Brighton, September 1972 (Oriel Press) at p. 342. The physical presence of the operator is required, as well as a device designed with a switch compatible with the battery system.

Another obvious and long-known approach is a solenoid or electromagnetic means to move a valve or cover as the device is turned on or off, which, consumes a substantial amount of the power of the cell or takes up substantial space.

A more primitive approach which is effective before the cell is operated is to place a sealing tab or plug on the cell (like a pull-tab on a soda can) to be removed when the cell is put in service, admitting oxygen to the assembly. The sealing tab or plug in combination with an airtight assembly at least prevents the deactivation of the zinc from external sources before use (while on the "shelf"), but once activated by removing the tab, small cells must be used completely within 1 to 3 months, or the cell will have self-discharged or dried out with no useful power remaining. If the cell is operated continuously, this "once-opened/always-opened characteristic makes little difference, but since most electrical devices are at least occasionally turned off for a period of time, a recloseable valve is important to protect the cell from degradation during that time.

The art of Mathews, U.S. Pat. No. 4,177,327, Dec. 4, 1979, previously mentioned, contemplates using a vent cover, in the form of a plug or a flap, in conjunction with an electrical heating element. The bimetal element in the Mathews patent is referenced as 1.625 inches (4.1 centimeters) long. The heating element was referenced to cover 0.75 inches (1.9 centimeters). The embodiment in the Mathews patent contemplated that the bimetal element would move to produce a clearance of 0.30 inches (0.75 centimeters). The moving portion of the vent cover assembly in the Mathews invention is parallel or roughly parallel to the flow of air into the cell. That position requires either 1) a significant loss of dimension in the length of the cell, if the cell is a cylinder, 2) a reduction in the available space of a cylindrical cell by creation of a cavity in the side of the cell or 3) a reduction in the height of the cell to accommodate the vent cover and heating apparatus. By comparison, a typical hearing aid battery is 1.16 centimeters ("cm.") in diameter and 0.42 cm. to 0.54 cm. thick, a typical "C" size flashlight battery is 2.6 cm. in diameter and 5 cm. high; a typical "D" size flashlight battery is 3.4 cm. in diameter and 6.0 centimeters high (The valve-on-a-chip is 0.4 cm.$\times$0.4 cm.$\times$0.1 cm. in total size).

The present invention uses significantly less space and is therefore suited to a single small cell configuration and avoids the loss in energy density either because of lower power drain or less space consumed or both.

In addition, the present invention is intended to be used, which was not claimed or disclosed in the prior art, to act as a pressure relief valve because the cover is to the exterior of the inlet to the interior of the cell or battery so that a plug or flap is not "trapped" against the outside container of the cell or battery. Further, another objective not disclosed or intended in the prior art, is to use corrosive fluid when the battery "leaks" to clog or to distort the semiconductor microactuator and causes the cell to cease to function generally by oxygen deprivation, although it may also occur by damaging the heating element which opens the semiconductor microactuator. This more reliably causes the battery to cease to operate when it is leaking than in prior art.

In all, the difficulty has been to produce a combination that preserves the energy density of the cell and at the same time provides a cell that can be "dropped into" a device and function automatically to preclude fluid and impurity entry while the cell and device are not operating. In addition, a pressure relief characteristic and "shutdown" of the cell on malfunction or "leakage" would be helpful, but all of these functions together cannot be achieved in the prior art.

Previously, limited efforts had been made to have certain types of valves on liquid electrolyte electrochemical cells as well. The prior art of Cheron, U.S. Pat. No. 4,039,728, is related to a valve which consumed substantial power which was the means, in combination with a fuel cell--, i.e., a special type of fluid depolarized electrochemical cell, to control the circulation of liquid electrolyte in the cell, which valve was actuated based on a parameter which is function of the circulation of electrolyte in the cell.

This invention overcomes the power and space requirements by using the new combination of an automatic valve of different materials and size, preferably a small electronic semiconductor microactuator, a "valve-on-a-chip", after the art of H. Jerman, U.S. Pat. No. 5,069,419, Dec. 3, 1991, (that valve and like valves, including those referenced in that patent, referred to as a "semiconductor actuator valve" or "valve-on-a-chip") in conjunction with a sealed gas depolarized electrochemical cell, especially a zinc-air cell. The sole means of entry of depolarizing fluid is through the valve on a chip. The combination produces a new and commercially useful invention by employing recent advances in semiconductor and micromachining technology that were not previously commercially available or invented. The invention contemplates the use of at least two layers, one of metal and one of semiconductor material, juxtaposed to each other.

The way the valve/cell combination works is that when the electrical device the cell is powering is "turned on", the consequent closing of the operating circuit causes the valve to open, admitting gas, normally air, to the cell. When the circuit is opened, meaning the electrical device the cell is powering is "turned off", the valve closes, precluding entry or exit of fluids or other impurities. The valve does not close as quickly as it opens, but this time is not significant compared to the many hours of time when exposure to the air would be typically closed off, and has the additional advantage of preventing "chatter", or unnecessary vibration, in certain applications.

There is sufficient residual oxygen or oxide compounds in the cell so that the cell will deliver sufficient power to start up and operate the valve-on-a-chip. This can be enhanced by the use of manganese dioxide or other catalytic agents in the cell. Such a cell has a higher starting power before oxygen fully penetrates the cathode pore structure. In any case a potential of generally over one volt exists between the cell electrodes. When the circuit containing the apparatus to be operated is closed, this invention causes electrons to flow from the zinc anode(s) through the electrical circuit and the valve to the cathode(s) of the cell or cells. Tuck, Modern Battery Technology, Ellis Horwood Series in Applied Science and Industrial Technology at generally pp. 126-188 (London, NY 1991).

This valve has the additional advantage that it is conducive to a pressure relief characteristic which continues to be usable as a vent closure after relief of the pressure.

BRIEF SUMMARY OF THE INVENTION

The primary object of this invention is to combine a new type of valve with a gas depolarized battery or cell to extend the life of the battery while preserving the energy density of the battery.

The preferred embodiment uses a micromachined electrically activated thermally responsive semiconductor microactuator. Impurities and depolarizing gas are excluded from the battery while it is off, and when a circuit containing the battery is activated, the semiconductor microactuator opens and the battery operates. The primary characteristic the combination that achieves these objectives is the self-contained, normally closed aspect with the activation facilities internal to the valve and adjacent to the valve opening. The valve is solely activated internally by the closing of an electrical circuit containing the valve and is not physically actuated by any means external to the valve such as an external solenoid or magnet, external mechanical or electromechanical device, physical connection with a switch or an external heating element.

The dual objectives of a valve cooperating with a battery or cell to relieve pressure, and also ceasing to function in the event of internal leakage from the interior of the battery or cell are achieved by this invention at the same time these power and size advantages are being realized.

By adding a resistance in parallel with the valve to change the apparent resistance of the invention, and in particular the combined resistance of the shunt resistance and the valve, the invention can be optimized to the operational voltage or amperage of the electrical load powered by the apparatus. In a typical flashlight cell, the desired voltage is less than the standard electric potential output of a zinc-air cell, and the internal resistance of the valve mechanism and a shunt resistance can reduce the voltage to a desired level. In keeping with the miniature size, the resistance may be a thin film resistance deposited on the semiconductor microactuator depending on the operational characteristics desired.

The invention is directed to a power supply in single cells and in batteries of cells. The invention is first directed to a combination in a single cell with an electrothermally responsive valve and a resistance in parallel with such a valve that cooperate together to achieve certain energy density and performance characteristics. The invention is also directed to the combination of a battery or cell and the process of placing an electrothermally responsive valve in combination with the battery or cell. The invention is also directed to the combination of a particular type of electrothermally responsive valve: a semiconductor microactuator in a battery or cell. The invention is also directed to the method of regulating fluid flow into a battery.

It is an object and advantage of this invention that the valve can also be designed to release pressure at specified levels by varying the diaphragm characteristics.

By achieving such objectives, a device particularly suited for small applications such as hearing aid cells, and cells the size of D, or C flashlight batteries or other common sizes is realized. By not needing to change the shape of the cell because of the small valve, the cell may be "dropped-in" to existing applications without need for modification of existing electrical devices which the invention will power.

The invention also may be modified to function as a fuse at a pre-determined setting.

The invention has another objective of rechargeability and claims are directed to use with a recharger and means of optimizing recharge.

Another objective is use of the semiconductor actuator in combination with the invention to control the circulation of electrolyte fluid.

A further objective is use of the semiconductor microactuator as a varying the rate of admission of depolarizing gas to the cell.

In addition, the objective of better "start-up" power and operation is achieved by mixing an additive oxidizer with the active cathode material of the cell or cells.

BRIEF DESCRIPTION OF THE DRAWINGS

The features referenced above and other features, objects and purposes of the present invention are discussed in greater detail in association with the accompanying drawings which aid in understanding the invention and its advantages and show a non-exhaustive group of embodiments.

DESCRIPTION OF THE PREFERRED EMBODIMENTS

Figure 1A:
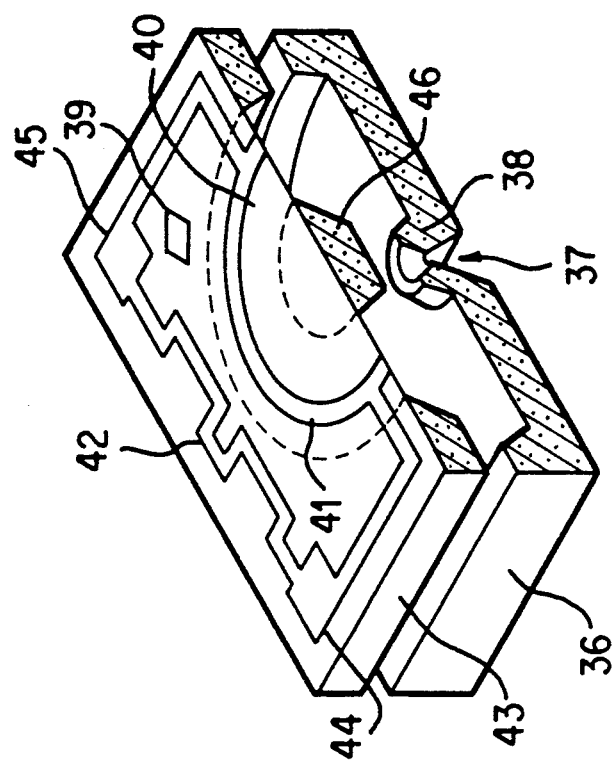
FIG. 1(a) and (b) are schematic presentations of an automatic self-contained semiconductor actuator valve-on-a-chip 1(a); the valve-on-a-chip in FIG. 1(b) is particularly modified for this application with an adjusted or special resistor on the chip to carry the main current or a resistor in parallel with the chip circuit depending on the application, current requirements and the battery configuration.
Figure 2:
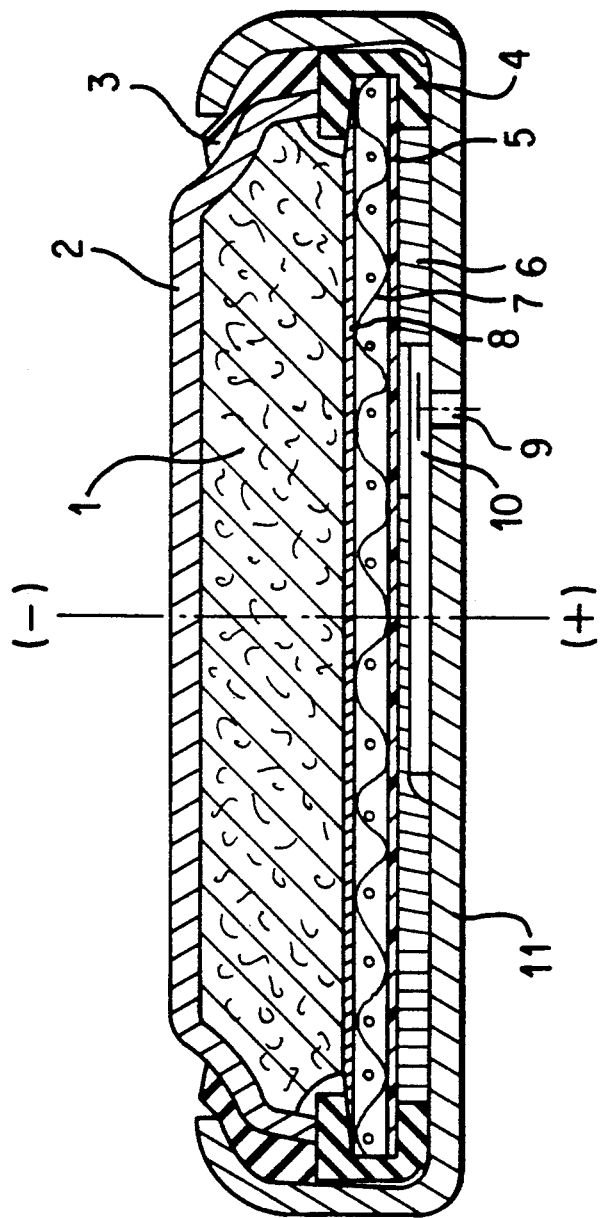
FIG. 2 diagrammatically illustrates a miniature metal-air cell with a valve-on-a-chip to control air entry.

FIG. 1(a) and (b) and FIG. 2 most easily illustrate the principles of the invention. The invention is readily adaptable to the family of gas depolarized electrochemical cells, most of which are described in McArthur et al., U.S. Pat. No. 4,547,438, Oct. 15, 1985, Zupancic, U.S. Pat. No. 4,529,673, Jul. 16, 1985, Mathews et al, U.S. Pat. No. 4,177,327, and in literature cited in those patents.

The term battery, as used in this document, includes an array of electrochemical cells, whether connected in series or parallel, or an individual cell, unless the term cell is employed, in which case, the term battery used in the same phrase does not include an individual cell.

This invention is useful in a one cell application. This invention overcomes the power and space deficiencies of prior art by using the new combination of an automatic valve made of different materials and of much smaller size through micromachining techniques, preferably a small electronic semiconductor microactuator, a "valve-on-a-chip", after the art of H. Jerman, U.S. Pat. No. 5,069,419, Dec. 3, 1991, in conjunction with a sealed gas depolarized electrochemical cell, especially a zinc-air cell. The sole means of entry of depolarizing fluid is through the valve-on-a-chip.

The class of valves useful in this invention is broader than the Jerman art because the self-contained, micromachined valve essential to this invention can include modifications of the Jerman art. The expression "electrically activated, thermally responsive valve" therefore includes the Jerman art and like valves that include and importantly contain a cantilever deformable element. An alternative design in this class of electrically activated, thermally responsive valves is a valve that contains juxtaposed members secured at each of their correspondent ends which members are made of materials of different thermal expansion coefficients. When one of these elements is heated, preferably the member flexing more rapidly on application of heat, the member bends and opens a gap between the members to admit fluid. Such a design can be achieved by modern micromachining techniques. The term electrically activated, thermally responsive valve excludes any valve or actuator which does not contain at least partially, the deformable element since the efficiencies of the invention cannot be obtained absent some containment. Containing the deformable element achieves comparable performance to the Jerman art which has solely translational displacement of its deformable member as the diaphragm heating varies, which means that the valve-on-a-chip is substantially or completely irrotational and has little or no transverse movement in the direction of flow of the depolarizing fluid, which minimizes the space usage. There can be more than two layers and the layers may be of metal or semiconductor material.

As will be apparent to those skilled in the field, while the art of Jerman considers bimetallic construction of aluminum and silicon, other metals such as copper, silver, gold, zinc, etc. could be substituted for the aluminum. Other semiconductor materials such as carbon, boron, gallium arsenide or indium phosphide are contemplated as substitutions for the silicon in the invention. These materials can be used in electrically activated, thermally responsive valves as well.

The inventions claimed in the Jerman art, the microactuators and microvalves described in the Jerman art, and their equivalents made of different materials are collectively referenced in this invention as a semiconductor microactuator or a valve on a chip.

FIG. 1(a) has perspective views of a self-contained micromachined, metal-semiconductor bilayer-actuated diaphragm valve described as a semiconductor microactuator after the art of H. Jerman, U.S. Pat. No. 5,069,419, Dec. 3, 1991 and as further described in marketing materials of the assignee of said patent, I. C. Sensors, Inc. which materials are entitled Electrically-Activated, Normally-Closed Diaphragm Valves by H., Jerman, the inventor of the valve-on-a-chip. The semiconductor microactuator pictured in FIG. 1 is approximately 4 millimeters square and 1 millimeter thick with the diaphragm 2.5 millimeters in diameter. In FIG. 1(a), a micromachined silicon valve body (36) contains a port (37) (normally the outlet port to what will be the interior of the battery), a valve seat (38), and a port (39) (normally the inlet port from the ambient atmosphere outside the battery) with that valve body mated to another micromachined silicon body (43) with a resistance heated diaphragm (40), and a metallized area (41) which is the resistance area for heating the diaphragm. An additional resistance, if one is added, is connected to two valve terminals (44) and (45).

Figure 1B:
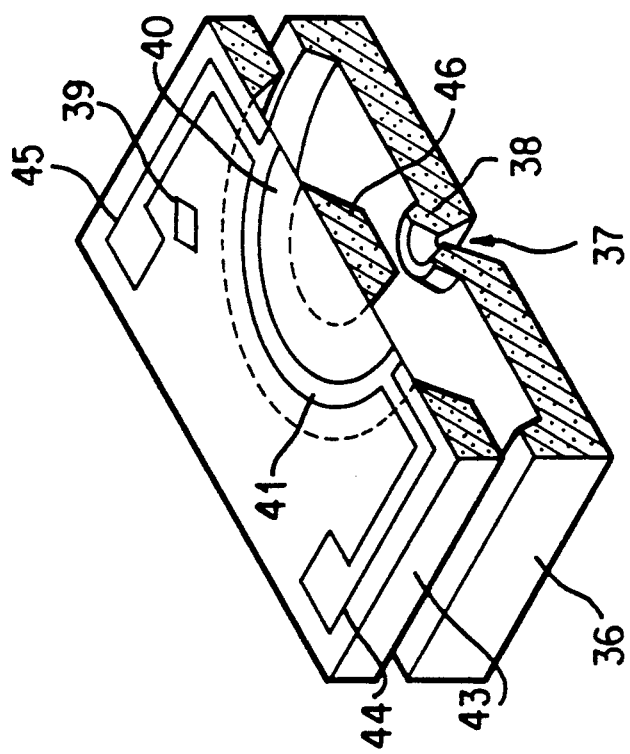

A similar assembly in FIG. 1(b) to that portrayed in FIG. 1(a) has a shunt resistance element (42) added to the chip as shown to make the device more functional for situations where the battery current needed for the apparatus to be powered is greater than could be delivered through the semiconductor microactuator absent a shunt resistor. Alternatively, a thin film resistance element between the terminals could be added to the chip as shown, physically or by depositing metallized material on the semiconductor microactuator, to make the device more functional in its valve-function-only configuration. A resistance element of optimized value and power capacity, normally between 0.05 and 1 ohms, which resistance is much less than the internal resistance of the semiconductor microactuator, could be wired in parallel with the semiconductor microactuator as an alternative design, especially for larger battery configurations.

As shown in FIG. 2, an exemplary very small gas depolarized electrochemical cell, such as for a hearing aid, is comprised of a zinc anode mixture (1) disposed adjacent to and in electrical contact with a cover (2) (which in this drawing is round but can be any shape and which will be negatively charged in this embodiment), which zinc anode mixture is one of the electrodes of the cell. A container (11) corresponding in shape to the shape of the cover (2) (which cover will be positively charged in this embodiment) surrounds a gasket (3) disposed on the inside edge of the container, both of which surround the cover (2), so that the gasket seals the cell and separates the negatively polarized cover from the positively polarized container (11). Another gasket (4) is disposed on the inside corner of the container to locally isolate the active cathode (7) from the inside of the container so that electrical output is forced to pass through the series connected semiconductor microactuator (10) mounted inside the container (11), the active cathode (7) being a porous cathode layer with a conductive metal mesh or screen in it and being one of the electrodes of the cell. Said gasket (4) is also disposed on the inside corner of the container to hold adjacent to the active cathode a separator (8) disposed between the zinc anode mixture (1) and the active cathode (7) to prevent the zinc anode mixture from contacting the active cathode, and further to hold adjacent to the active cathode in successive layers beginning adjacent to the active cathode, an electrolyte-proof membrane (5) made of a material such as Teflon (Dupont Trademark), a porous gas diffusion pad and spacer (6) with a cavity (10) in it in which to place the semiconductor microactuator, which cavity (10) is aligned with an air inlet (9) (an aperture in the container (11))so that the entry of air through the aperture (9) in the container (11) is controlled by the semiconductor microactuator, disposed on the inside surface of the container (11) with its inlet (39) over the aperture (9) in the container (11). Electrical contacts are made internal to the cell of the semiconductor microactuator terminals (44) and (45), with or without a shunt resistance, in series to the active cathode (7) and the exterior container (11). In order to permit gas communication between the exterior of the cell and the interior, but exclude liquids and solid impurities, a gas permeable, electrolyte impermeable membrane (5) is disposed between the porous cathode layer (7) and the porous gas diffusion pad and spacer (6), which membrane (5) is made of a material such as polytetraflouroethylene (such as that sold as Teflon (trademark of Dupont Corporation)). A semiconductor microactuator is disposed on the inside surface of the container (11) in the earlier mentioned cavity in the porous gas diffusion pad and spacer (6) so that the sole means of gas communication from the exterior of the battery to the interior is through the air inlet into and through the semiconductor microactuator through the gas permeable membrane to the porous cathode layer. Electrical connections are made from the terminals (44), (45) of the semiconductor microactuator and to the conductive member of the cathode layer (7) and to the container (11). A resistance (a thin film resistance is shown as (42))

is attached to said terminals to be in parallel with the metallized area (41). Although not shown in the figure, if a lower output of current from the battery is needed, a resistance in series with the semiconductor microactuator may be connected between the terminal of the semiconductor microactuator and the container (11).

Additional sealants, cell parts and space refinements may be also employed in such a design without departing from the spirit of the invention. When the cell is connected to an electrical load, the closing of the circuit containing the load causes current to pass through the semiconductor microactuator, causing it to open, gas (e.g. air) to be admitted, and the gas depolarized electrochemical cell to power the apparatus containing the circuit. In other words, the semiconductor microactuator functions so that when it is closed the interior of the cell is effectively sealed from the ambient, and when it is open, gas communication from the ambient to the interior of the cell case is permitted.

The previous embodiment has the semiconductor microactuator connected between the container and the active cathode (7) which is one of the electrodes of the cell; in the next embodiment, the connection is made between the electrode of opposite polarity, the zinc anode mixture, and the container.

Figure 3:
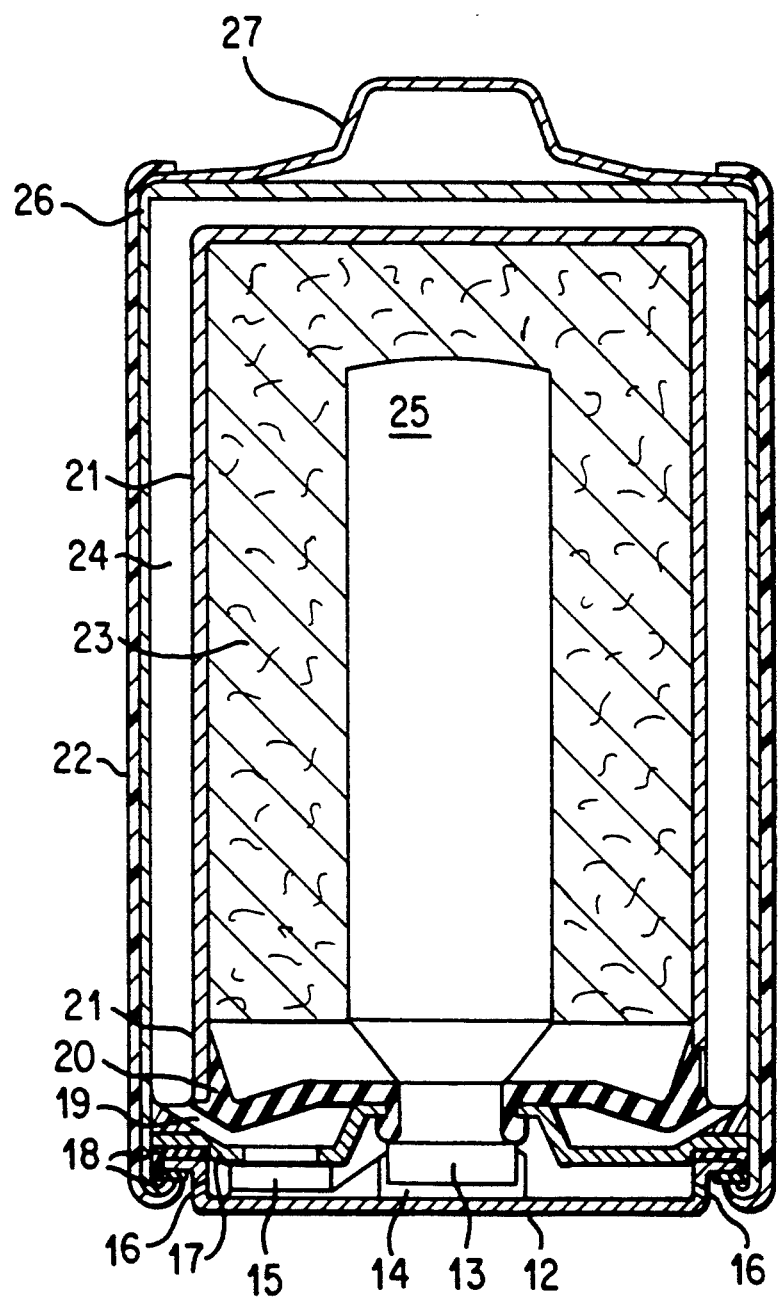
FIG. 3 diagrammatically illustrates a larger cylindrical metal-air cell with a valve-on-a-chip to control air entry.

FIG. 3 illustrates another preferred embodiment where the semiconductor microactuator is disposed in a larger cylindrical cell. The shape could also be prismatic. Such a cylindrical cell is comprised of a container (12) which will be negatively charged, which container is round and is shaped like a shallow pan, and has a circumferential edge upturned at a right angle and then bent again at a right angle to form a second circumferential edge parallel to and outward from the center of the container. Apertures (16) are penetrated through the first upturned circumferential edge. An insulating cap (14) is placed adjacent to and centered on such container which cap is contained partially by such upturned circumferential edge. A solid contact member (13) is seated in such cap. The solid contact member passes through the cell seal structure to a corrosion resistant conducting collector (25) in electrical contact with the zinc anode mixture (23). The solid contact member (13), the corrosion resistant conducting collector (25) and the zinc anode mixture (23) form one electrode of the cell. A semiconductor microactuator (15) as illustrated in FIG. 1 is disposed in the corner of such container, the semiconductor microactuator being electrically connected between the solid contact member of negative polarity (13) and the container (12). Adjacent to the second outer circumferential edge of the container (12) are superposed two insulating gaskets (18) on top of and beneath such outer circumferential edge. The gasket on top of the second outer circumferential edge insulates an inside structural bracing member (17) adjacent to it, which inside structural bracing member holds the solid contact member (13) in a centered position. The structural bracing member (17) has an inlet in it to admit depolarizing gas to the interior of the cell over which inlet is disposed the semiconductor microactuator between the container (12) and the inside structural bracing member (17). The semiconductor microactuator is the only means of air access to the active portion of the cell. On the inside structural bracing member (17), in a direction away from the container (12), is a sealing member (20) which is either porous or contains vent holes (19) for air entry to the porous cathode member (24). The conducting collector (25) is cylindrical and one end is seated on and attached to the solid contact member (13). Surrounding the conducting collector (25) is a zinc anode mixture (23) contained within in a separator member (21) which is shaped like an open ended cylinder with the open end sealed to the edge of the sealing member (20). Surrounding the separator member is a porous cathode mixture (24) which is electrically conductive, has appropriate catalysts such as manganese dioxide, and has binders in it. The porous cathode mixture is contained within a corrosion resistant can (26) made of corrosion resistant metal or other material with conducting properties which can is shaped like an open-ended cylinder. The open end of the can (26) has a lip bent to the center of its cylindrical shape, which lip is sealed to the gasket (18) beneath the second outer circumferential edge of the container (12) and thus encloses the contents of the cell. A positive contact piece (27) is superposed over the closed end of the can. The positive contact piece (27), the can (26), and the porous cathode mixture are the electrode of the cell with opposite polarity to the electrode which includes the zinc anode mixture. A decorative label (22) surrounds the outside of the can (26) except on the end where the positive contact piece (27) covers the can. As in the previous embodiment (FIG. 2), when the semiconductor microactuator is closed, the active ingredients of the cell are effectively sealed from the ambient and when the semiconductor microactuator is open, gas communication from the ambient to the active portions of the cell is permitted.

Figure 4:
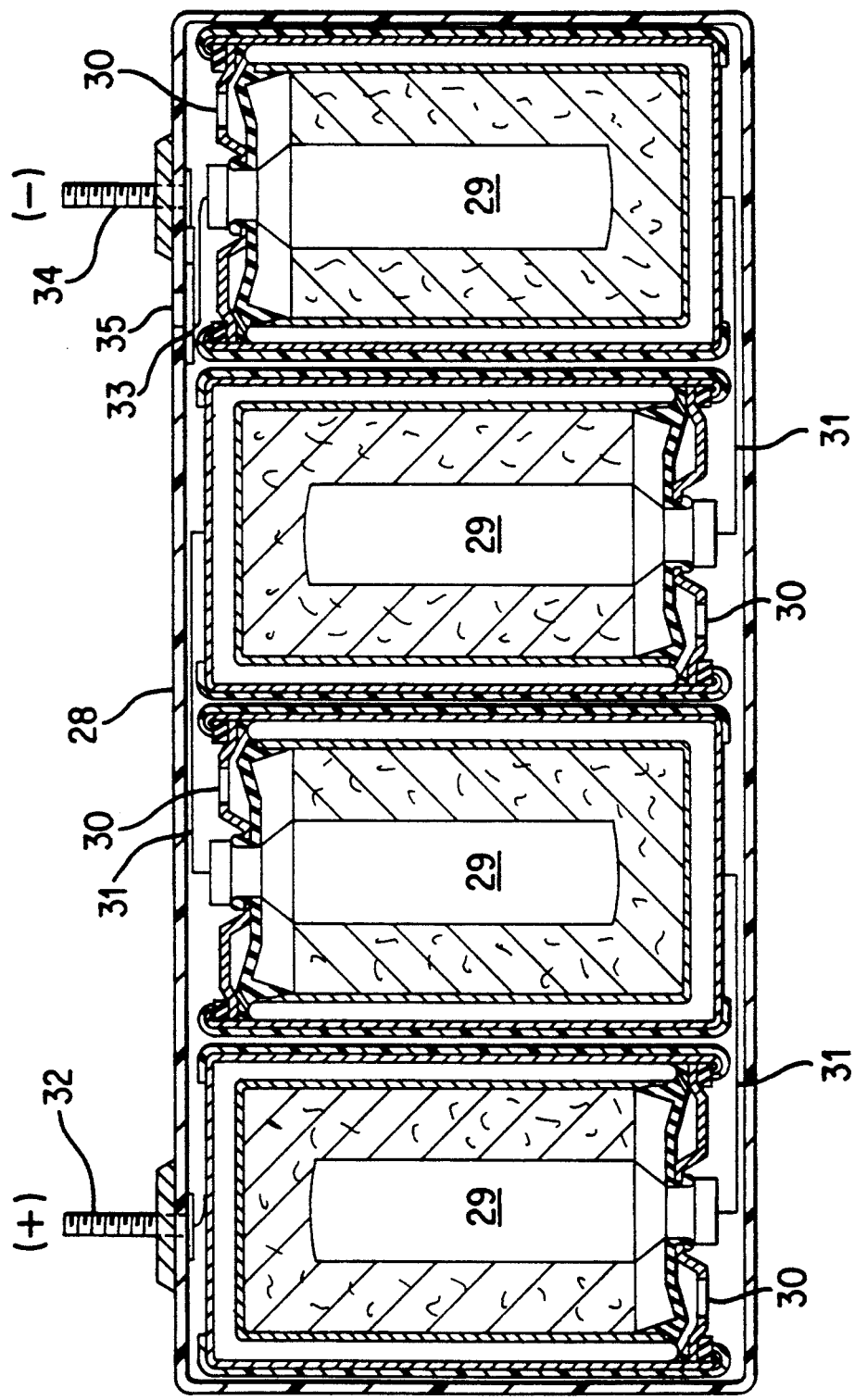
FIG. 4 diagrammatically illustrates the incorporation of a valve-on-a-chip in or on the battery case to control air access to a multiple cell battery contained in the case.

FIG. 4 shows another preferred embodiment comprised of an airtight non-polarized case (28) surrounding a set of connected cells (29) with apertures (30) on cells (29), having two electrodes in each cell, one of which is a positive pole connection member (32). The cells in this FIG. 4 are connected in series with intercell connectors (31). A semiconductor microactuator (33) is disposed inside the surface of the case as over an inlet (35) in the case (28) and electrically connected and disposed between at least one negative terminal of the cells (29) and the negative terminal (34) of the battery assembly. The inlet may have a semipermeable membrane such as Teflon (Trademark of Dupont Co.) placed to prevent non-gaseous material from entering the case (28). The cells may be connected in series as shown, or in parallel or some permutation thereof. As in the previous preferred embodiments when the semiconductor microactuator is in the closed position, the interior of the battery case is effectively sealed from the ambient, and when the semiconductor microactuator is in the open position, gas communication from the ambient to the interior of the battery case and into the cells is permitted.

In a plurality of cells such as shown in the drawing, the cells are internally linked in series, positive to negative pole with the "end" cells having the external electrodes. The group of cells is sealed so that air can only enter through the vent holes.

There are many examples of gas or liquid depolarized electrochemical cells in the art, virtually all of which can be adapted, using the examples above, to use the semiconductor microactuator without substantially changing the size or power characteristics of the cell. The art of McArthur, Mathews and Zupancic and literature cited in those patents illustrate the many types of cells to which this invention can be adapted.

By inserting a microprocessor chip which has voltage sensing and current sensing characteristics, and in response to either or both of those characteristics can vary the power supplied to the valve on a chip, particularly to the resistance means in the valve on a chip, further refinements in optimizing or regulating fluid flow can be obtained. Such a microprocessor chip is optimally placed in the cell adjacent to the valve-on-a-chip connected by leads to the valve on a chip and container (11) and the conductive member of the cathode layer, or placed inside the airtight non-polarized case near a terminal and the semiconductor microactuator and can be connected as shown in FIG. 6.

Figure 6:
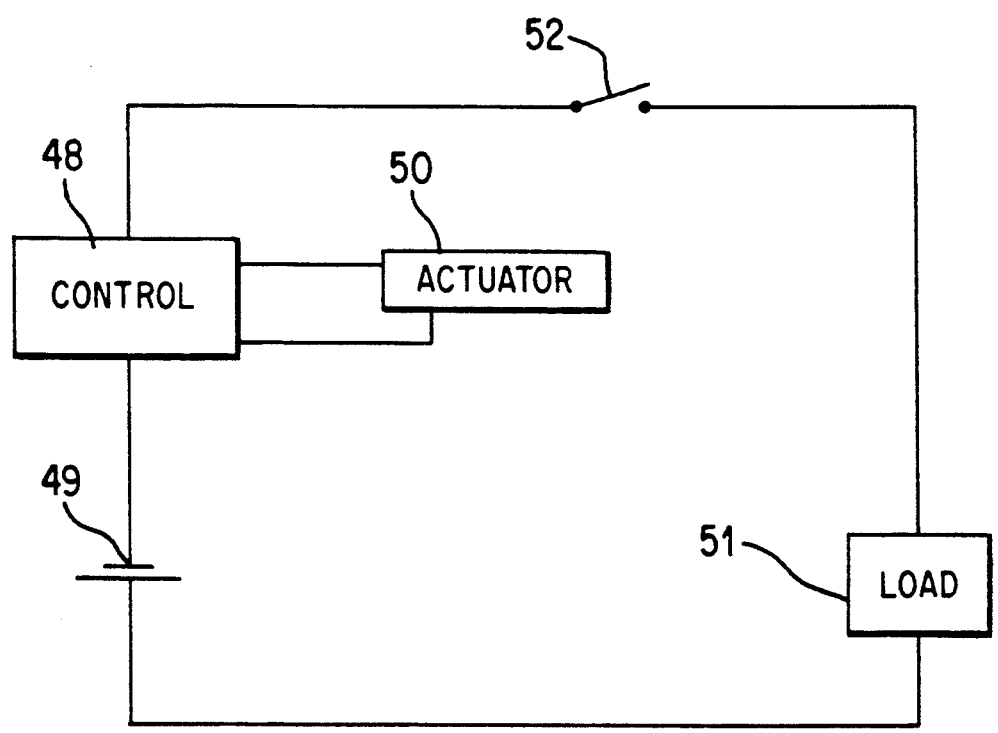
FIG. 6 schematically illustrates the addition of a microprocessor for control purposes in series with an electrical switch.

FIG. 6 illustrates a load (51) connected in series with a switch (52), control mechanism (48) and a battery (49). The control mechanism (48) has voltage sensing and current sensing characteristics and can be a microprocessor chip which responds to voltage and current characteristics. In response to those characteristics, the control mechanism (48) can vary the power supplied to the valve-on-a-chip, particularly to the resistance means in the valve-on-a-chip. By so doing, refinements in optimizing or regulating fluid flow through the actuator (in this case using the valve-on-a-chip) can be used to alter the fluid flow into the battery (49) or alternatively, to another battery. If the batteries are connected inside an airtight nonpolarized case, the actuator may actually be actuated on the case and controlled by a mechanism in series or partial parallel with the battery group inside the case. The control and actuator mechanism can be used to optimize load level in between subarrays of one cell or multiple cells in a battery as well as optimize recharging and discharge.

Figure 5B:
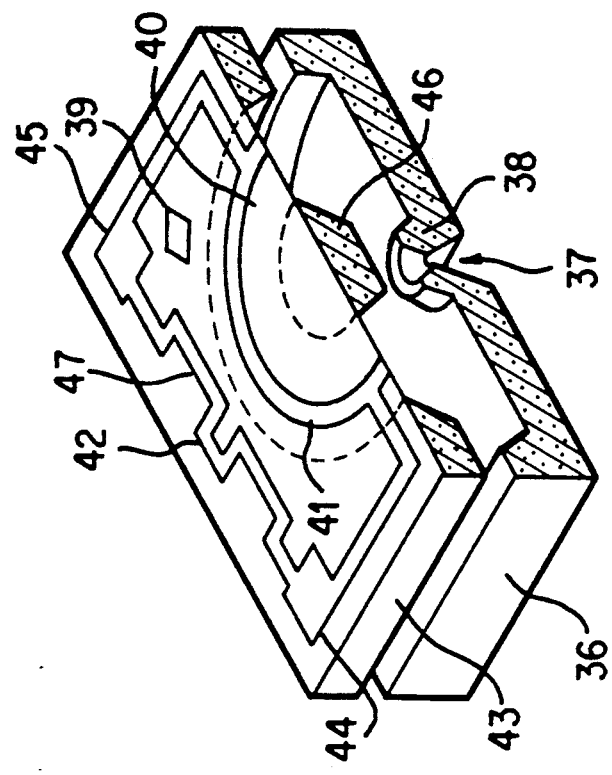
FIG. 5 diagrammatically illustrates the contrast between cross section of the shunt resistance added to identical FIGS. 5(a) and 1(a) and seen in FIG. 1(b) and the reduced cross-section portion in FIG. 5(b).
Figure 5A:
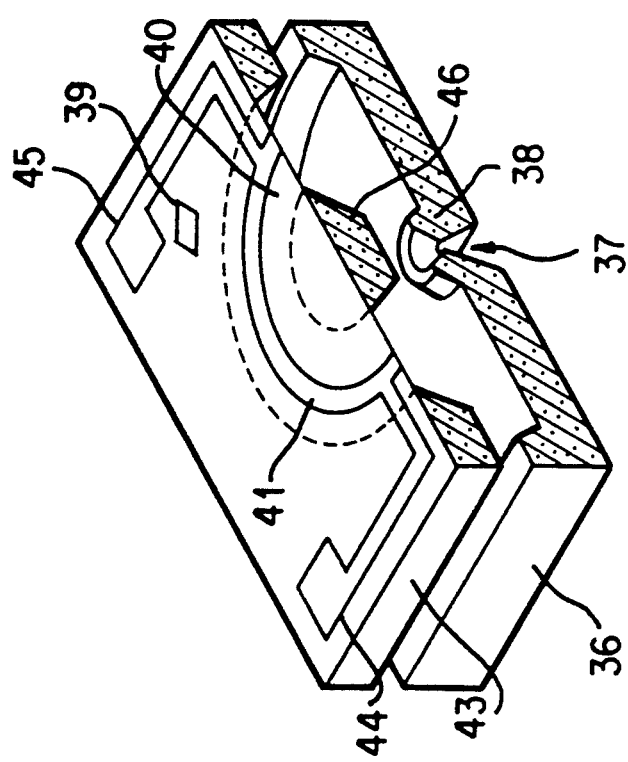

If it is desired to have the semiconductor microactuator function as a fuse then the current carrying capacity of the resistors or the shunt circuit must be designed to fail at the desired electrical current level. The material chosen for the shunt or resistors will be from among possible metals or semiconductor materials such as mentioned above to yield the optimum balance of operating resistance considered against the desired failure upon overheating caused by the undesired or higher current level. The valve body or the shunt could also be insulated to increase the heating effect so that less current was required to cause failure. Since the resistors driving the bilayer deformation are higher in value, it is anticipated that in most cases the shunt circuit will be the fuse element intended to fail. The requirement then would be to make at least a short section of the shunt of the appropriate cross section to "blow" at the desired current level. As shown in FIG. 5(b), (in contrast to 5(a) which is identical to FIG. 1(a), the shunt resistance (42) can have a reduced cross-section portion (47) to achieve the fuse characteristic.

The semiconductor actuator shown in FIG. 1 will function as a pressure relief device when pressure is placed on the outlet (37) side against the diaphragm.

To design the semiconductor microactuator to function as a vent at a predetermined pressure it is necessary to make the semiconductor microactuator so that the desired vent pressure equals the sum of the pressure required to overcome the partial pressure of the depolarizing gas (e.g. oxygen of the air) plus the built-in closure force in the semiconductor microactuator diaphragm on the area of the valve seat. According to the description of the valve-on-a-chip provided by I.C. Sensors, Inc. (titled Electrically-Activated, Normally-Closed Diaphragm Valves by H., Jerman, the inventor of the valve-on-a-chip), the displacement in the valve-on-a-chip is fully proportional to the force applied without hysteresis. For a valve-on-a-chip with a 5 micron aluminum thickness of the diaphragm and an 8 micron silicon layer, and a valve seat diameter of 400 micron, the most likely opening pressure is that required to overcome the 3 psi partial pressure of oxygen in the air if the valve-on-a-chip is employed on a metal-air battery. At a sacrifice in power required to open it, the valve-on-a-chip can be designed to require greater pressure to open. The above reference from I.C. Sensors, Inc. implies that for the same valve-on-a-chip the spring constant is approximately 160 dynes per micron. Referring to FIG. 1(a) and 1(b), either or both the valve boss (46) and the valve seat (38) can be made so interference of these parts and deformation of the diaphragm (40) occurs when the valve-on-a-chip is assembled. Then more pressure--, i.e., that is 160 dynes per micron of deformation during assembly will be required to open the valve-on-a-chip to relieve the built-in pressure of the valve body. The deflection of this particular valve on a chip for a 50° C. temperature rise is 27.3 microns. If one assumes that 20 microns, is the maximum deformation which will still permit satisfactory operation of the valve-on-a-chip, then the maximum bent pressure before release must overcome the 3200 dynes force (to achieve unloading of the diaphragm (40) and the effect of the partial pressure of the depolarizing gas (3 psi for oxygen in air). Since the area of the valve opening is only 0.0016 cm$^2$, the pressure in the cell must be about 3200 dynes/0.0016 cm$^2$ or 2,000,000 dynes/cm$^2$ (29 psi). Thus, the total vent opening pressure would be 32 psi. Any value between three and 32 psi could be achieved by making either or both the valve boss (46) or the valve seat (38) with more or less height for interference on assembly. Since cells of this type usually are designed with a low vent pressure for safety reasons, this range covers most designs typically required.

If relief at a different or more specific pressure is desired, the use of an additional layer, or circular web of material on the deformable element in the semiconductor microactuator or changing the thickness of the deformable element will accomplish the fine tuning of the pressure relief characteristic. Necessarily, the change in the construction of the moving or flexing element to accomplish the pressure relief characteristic may necessitate slight relocation or change to the placement of the heating element so that upon electrothermal actuation, the necessary fluid flow of depolarizing agent to the battery is maintained.

It is also a useful advantage that if the cell is subjected to a large current overload, the valve function will be destroyed breaking the electrical circuit if the valve-on-a-chip is in series with the power device, or precluding further admission of oxygen, eventually eliminating the power capacity of the cell or cells. Further leakage from malfunction of the cell or battery of cells will damage the opening function of the valve-on-a-chip, minimizing damage to the apparatus powered by the cell or battery of cells. Under such circumstances the semiconductor microactuator would act as a safety device.

The valve-on-a-chip can be very small (4 mm.×4 mm.×1 mm.) and thus uses very little space and can be literally "tucked" into the cell without having to alter the exterior of the cell so radically as to require redesign of the devices that the fluid depolarized cells typically operate. The preferred embodiment of invention uses a valve that has solely translational displacement of its deformable member as the diaphragm heating varies, which means that the valve-on-a-chip is substantially or completely irrotational and has little or no transverse movement in the direction of flow of the depolarizing fluid, which minimizes the space usage. The semiconductor microactuator is a miniature valve literally contained in a device the size of an integrated circuit "chip". When power is supplied to the semiconductor microactuator, the semiconductor microactuator opens and allows fluid to pass while consuming little power of the cell and with minimal movement. The valve-on-a-chip is available for a variety of operating conditions, namely different flows and different power applications. The art disclosed below related to adding a resistor or resistance means in parallel to the semiconductor actuator valve gives the valve even broader use and more flexibility in this invention.

The dimensions of the valve-on-a-chip are approximately 4 mm×4 mm×1 mm. The thinnest portion of the valve-on-a-chip is perpendicular to the direction of air flow into the cell. This enables the valve-on-a-chip to be smallest in the most critical dimension to reduce space consumption in the cell and to be mounted on the exterior or interior surface of the cell container almost as if a thick paint chip is placed flat on the cell surface.

The principal applications are expected to be for small metal/metal oxide-oxygen depolarized cells but other uses can be readily envisioned and are presented in this invention. For instance, the degree of opening of the semiconductor microactuator could be controlled by a small computer, microprocessor or other means and then the semiconductor microactuator used as a regulator of reactant air, cooling air, electrolyte circulation or other fluid flows.

In an air/zinc system, each cell delivers about 1.4 volts, in series, two cells deliver 2.8 volts etc. Because this may be above the preferred ambient operating voltage of the device being powered, a shunt resistor and the internal resistance of the semiconductor microactuator may be designed to slightly reduce the ambient operating voltage delivered by the cell. If a multiplicity of cells is connected in parallel internally and the valve-on-a-chip is connected in series with a parallel cell combination, the cells will deliver the same voltage, but more amperage or current. If the current is above the rated capacity of the semiconductor microactuator, the semiconductor microactuator must be protected. One way to do this is by mounting the semiconductor microactuator on the surface of the cell inside a battery of cells, connecting the semiconductor microactuator so that it is in series with a single cell added for the purpose or by inserting a low resistance shunt circuit by or on the chip to divide the current flow between the semiconductor microactuator and the shunt resistor improving the overall function of the invention.

Another way to accomplish this in an array of cells in a battery, with or without a shunt resistor, is to connect the semiconductor microactuator by one of its terminals to the electrode of a single cell as before, but the other semiconductor microactuator terminal would be connected to the parallel combination of the cells. The semiconductor microactuator would still be disposed to admit air to all of the cells on the external casing of the group of cells. More than one semiconductor microactuator can be disposed and connected for each cell, or subgroup of cells in a battery depending on the use and power being delivered.

The embodiments represented herein are only a few of the many embodiments and modifications that a practitioner reasonably skilled in the art could make or use. The invention is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

What is claimed is:

1. A battery comprising:
   at least one gas depolarized electrochemical cell having an interior and at least two electrodes wherein said interior of said cell is enclosed within a container which includes inlet means for funneling depolarizing gas into said interior of said cell and wherein one of said at least two electrodes is an active cathode;
   at least one resealable, electrically activated and thermally responsive valve means for placement inside of said container to allow entry of depolarizing gas into said cell through said inlet means and then into said interior of aid cell only when said cell is operating to supply energy to an electrical device which said cell is connected to as a power source, said valve means being comprised of shunt resistance means between two terminals located on means for deforming upon application of power to said shunt resistance means; and
   means for actuating said valve means by closing an electrical circuit which includes said cell to thus permit entry of depolarizing gas to said interior of said cell.

2. The battery as in claim 1 wherein said at least one valve means opens mechanically or electromechanically at a predetermined pressure.

3. The battery as in claim 2 further comprising recharging means for connection to said battery for recharging said battery.

4. The battery as in claim 3 further comprising measurement means and control means responsive to said measurement means for connection to said battery for preventing overcharging of said cell.

5. The battery as in claim 4 wherein said shunt resistance means is a thin film resistance.

6. The battery as claim 5 further comprising means for insulating a heating element located inside of said at least one valve means from said at least one valve means' body in order for said heating element to fail if overcurrent flows through said at least one valve means.

7. The battery as in claim 6 further comprising control means having a microprocessor for being connected to said battery in order to optimize said battery's performance for a given electrical load.

8. The battery as in claim 7 further comprising fluid circulation means and fluid circulation control means for connection to said battery to circulate fluid through said cell.

9. The battery as in claim 8 further comprising an additive oxidizer for placement in said active cathode of said at least one cell.

10. The battery as in claim 9 wherein said at least one valve means is a semiconductor microactuator valve-on-a-chip.

11. The battery as in claim 10 wherein said valve means and said actuation means cooperate to cause said cell to cease to operate upon leakage of corrosive fluid from said cell to minimize damage said electrical device which said cell is powering.

12. The battery as in claim 11 wherein said valve means acts as a pressure relief valve to allow excess pressure to exit said cell.

13. The battery as in claim 12 wherein said valve means is approximately 4 mm by 4 mm by 1 mm.

14. The battery as in claim 13 wherein said cell consumes less than 20% of the output energy density of a typical size-D gas depolarized electrochemical cell under a load of 500 mA when tested with a resistance means of less than 0.4 ohms in parallel with said valve means.

15. A battery comprising:
at least two terminals protruding outwardly from an airtight, non-polarized case with at least one inlet means therein for funneling depolarizing gas into at least one gas depolarized electrochemical cell which is enclosed by said case, wherein each of said at least one cell have at least two electrodes wherein at least one of said at least two electrodes is an active cathode;
at least one resealable, electrically activated and thermally responsive valve means located inside said battery for allowing entry of depolarizing gas into said cell through said inlet means into said cell's interior only when said cell is operating to supply energy to an electrical device which said cell is connected to as a power source, said valve means being comprised of shunt resistance means between two terminals located on means for deforming upon application of power to said shunt resistance means, said at least one valve means by closing an electrical circuit which includes said battery to permit entry of depolarizing gas to said cell inside said battery.

16. The battery as in claim 15 wherein said at least one valve means opens mechanically or electromechanically at a predetermined pressure.

17. The battery as in claim 16 further comprising recharging means for connecting to said battery to recharge said battery.

18. The battery as in claim 17 further comprising measurement means and control means responsive to said measurement means for connection to said battery to prevent overcharging of said cell.

19. The battery as in claim 18 wherein said shunt resistance means is a thin film resistance.

20. The battery as in claim 19 further comprising means for insulating a heating element located inside of said at least one valve means from said at least one valve's body in order for said heating element to fail if overcurrent flows through said at least one valve means.

21. The battery as in claim 20 wherein said at least one valve means is a semiconductor microactuator valve-on-a-chip.

22. The battery as in claim 2 further comprising control means having a microprocessor for connection to said battery to optimize said battery's performance under a given electrical load.

23. The battery as in claim 22 further comprising fluid circulation means and fluid circulation control means for circulating fluid through said cell.

24. The battery as in claim 23 further comprising additive oxidizer means for disposition in said active cathode of said at least one cell.

25. The battery as in claim 24 wherein said valve means and said actuation means cooperate to cause said battery to cease to operate upon leakage of corrosive fluid from the interior of said battery so as to minimize damage to an electrical device which said battery is powering.

26. The battery as in claim 25 wherein said valve means is a pressure relief valve to allow excess pressure to exit said battery through said at least one valves means.

27. The battery as in claim 26 wherein said deformable member has a displacement approximately less than or equal to 3 mm.

28. A method of regulating fluid flow into a battery having at least one gas depolarized electrochemical cell comprising:
positioning within said battery at least one resealable, micromachined, electrically activated and thermally responsive valve means for regulating flow of depolarizing gas into said battery's interior and said cell's interior through inlet means in said battery and said cell, respectively, and through said valve means only when said battery is operating to supply energy to an electrical device which said battery is connected to as a power source; and
electrically connecting said at least one valve means to an actuator means for sealing said inlet means in said battery to prevent depolarizing gas from entering said battery and said at least one cell when said battery is not operating to supply energy to a device to which said battery is connected as a power source.

29. The method as in claim 28 further comprising applying a predetermined pressure to mechanically or electromechanically open said at least one valve means.

30. The method as in claim 29 further comprising connecting a recharging means to said battery for recharging said cell.

31. The method as in claim 30 further comprising connecting measurement means and control means responsive to said measurement means to said battery for preventing overcharging of said cell.

32. The method as in claim 31 further comprising connecting shunt resistance means to said at least one valve means.

33. The method as in claim 32 wherein said shunt resistance means is a thin film resistance.

34. The method as in claim 33 further comprising connecting control means having a microprocessor to said battery for optimizing said battery's performance under a given electrical load.

35. The method as in claim 34 further comprising circulating fluid through said battery via fluid circulation means and fluid circulation control means.

36. The method as in claim 35 further comprising disposing an additive oxidizer in said active cathode of said at least one cell of said battery.

37. The method as in claim 36 further comprising disposing means for insulating a heating element located inside said at least one valve means from said at least one valve means' body so that said heating element fails if overcurrent flows through said at least one valve.

38. The method as in claim 37 wherein said at least one valve is a semiconductor microactuator valve-on-a-chip.

39. A battery comprising:
a single fluid depolarized electrochemical cell having at least two electrodes and a container means wherein at least one of said at least two electrodes is an active cathode and said at least two electrodes are separated from each other by a plurality of gaskets, said at least two electrodes and said container means cooperating to from an interior chamber wherein a metal-anode mixture and a porous cathode member are housed separated from contacting each other by separator means, one of said at least two electrodes having at least one air vent hole so that depolarizing fluid may enter said interior chamber to contact said porous cathode member, a resealable, electrically activated and thermally responsive valve means placed inside said cell to connect said at least one air vent hole to said interior chamber for regulating flow of depolarizing fluid into said battery in order for said valve means to cooperate with actuator means to allow depolarizing fluid to enter said interior chamber of said cell only when said cell is operating to supply energy to an electrical device which said battery is connected to as a power source.

40. A battery comprising:

a case having a valve means therein and at least two terminals which protrude outwardly therefrom and wherein said case encloses a plurality of fluid depolarized electrochemical cells, each of said cells having at least two electrodes and a container with inlet means and enclosing an interior chamber which houses a metal-anode mixture and a porous cathode member separated from contacting each other by separator means, said inlet means in said container of each of said cells for allowing entry of depolarizing fluid into said interior chamber of said cell to contact said porous cathode member, said valve means of said case including a resealable, electrically activated and thermally responsive valve and actuator means for regulating flow of depolarizing fluid into said battery in order for said valve means cooperating with said actuator means in order to control the flow of depolarizing fluid into said battery and thus into said interior chamber of said cell only when said battery is operating to supply energy to an electrical device which said battery is connected to as a power source.

* * * * *